US012792120B2

(12) United States Patent
Lu et al.

(10) Patent No.: US 12,792,120 B2
(45) Date of Patent: Nov. 10, 2026

(54) POWER SUPPLY SYSTEM, POWER CONVERTER AND POWER CONVERSION METHOD CONFIGURED TO DETERMINE WHETHER THE FRONT STAGE POWER IS STABLE AND CONTROL THE CONVERSION CIRCUIT

(71) Applicant: DELTA ELECTRONICS, INC., Taoyuan City (TW)

(72) Inventors: Ting-Yun Lu, Taoyuan City (TW); Cheng-Yi Lin, Taoyuan City (TW); Ren-Xiang Tu, Taoyuan City (TW); Sheng-Yu Wen, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 255 days.

(21) Appl. No.: 18/415,682

(22) Filed: Jan. 18, 2024

(65) Prior Publication Data

US 2025/0068223 A1 Feb. 27, 2025

(30) Foreign Application Priority Data

Aug. 25, 2023 (CN) ........................ 202311081803.X

(51) Int. Cl.
*G06F 1/28* (2006.01)
*H02M 7/04* (2006.01)

(52) U.S. Cl.
CPC ................. *G06F 1/28* (2013.01); *H02M 7/04* (2013.01)

(58) Field of Classification Search
CPC ........................................................ G06F 1/28
See application file for complete search history.

(56) References Cited

U.S. PATENT DOCUMENTS

2004/0105281 A1* 6/2004 Nakazawa ........ H02M 3/33507 363/21.07
2013/0293012 A1* 11/2013 Song ......................... H02J 9/06 307/24

(Continued)

FOREIGN PATENT DOCUMENTS

BR 112020012365 A2 * 1/2021 ............ H02M 3/156
CN 2691156 Y 4/2005

(Continued)

OTHER PUBLICATIONS

Maxim Integrated Products Inc., "Design Guide USB-C and USB Power Delivery Solutions", retrieved from the Internet: URL: https://www.maximintegrated.com/content/dam/maxim/techdocs/productguides/usb-c-and-usb-power-delivery-solutions-design-guide.pdf , Mar. 1, 2024, 12 pages.

(Continued)

*Primary Examiner* — Suresh Suryawanshi
(74) *Attorney, Agent, or Firm* — CKC & Partners Co., LLC

(57) ABSTRACT

A power converter includes an input circuit, a conversion circuit, an output circuit and a processor. The input circuit is configured to receive and detect a front stage power from a front stage device. The conversion circuit is coupled to the input circuit. The output circuit is coupled to the conversion circuit and configured to supply power to a back stage device. The processor is coupled to the input circuit, the conversion circuit and the output circuit. The processor is configured to determine whether the front stage power is stable, and is configured to handshake with the back stage device to confirm a conversion power agreed by the back stage device. The processor is further configured to control the conversion circuit to operate at the conversion power, so as to generate an output power to the back stage device.

23 Claims, 7 Drawing Sheets

(56) References Cited

U.S. PATENT DOCUMENTS

| | | | | |
|---|---|---|---|---|
| 2016/0126770 | A1 | 5/2016 | Chen et al. | |
| 2016/0231777 | A1 | 8/2016 | Decamp | |
| 2017/0093292 | A1 * | 3/2017 | Chan ................. | H02M 3/33507 |
| 2021/0234393 | A1 | 7/2021 | Sultenfuss et al. | |
| 2022/0239135 | A1 * | 7/2022 | Li ............................. | H02J 7/00 |
| 2022/0390996 | A1 | 12/2022 | Sultenfuss et al. | |

FOREIGN PATENT DOCUMENTS

| | | | | | |
|---|---|---|---|---|---|
| CN | 102262193 | A | * | 11/2011 | |
| CN | 110289658 | A | | 9/2019 | |
| CN | 212875682 | U | * | 4/2021 | |
| CN | 114156966 | A | * | 3/2022 | ................ H02J 7/96 |
| CN | 115133598 | A | | 9/2022 | |
| CN | 116247762 | A | | 6/2023 | |
| JP | 2020-523978 | A | | 8/2020 | |
| TW | 201116837 | A | | 5/2011 | |
| TW | M582707 | U | | 8/2019 | |
| WO | WO-9501000 | A1 | * | 1/1995 | ........ H02M 3/33569 |
| WO | 2022/180799 | A1 | | 9/2022 | |

OTHER PUBLICATIONS

Hasanah Rini Nur et al., "DC-DC Converter for USB-C Power Adapter in Residential DC Electricity", 2019 IEEE Conference on Energy Conversion (CENCON), IEEE, Oct. 16, 2019, pp. 207-212.

* cited by examiner

POWER SUPPLY SYSTEM, POWER CONVERTER AND POWER CONVERSION METHOD CONFIGURED TO DETERMINE WHETHER THE FRONT STAGE POWER IS STABLE AND CONTROL THE CONVERSION CIRCUIT

CROSS-REFERENCE TO RELATED APPLICATION

This application claims priority to China Application Serial Number 202311081803.X, filed Aug. 25, 2023, which is herein incorporated by reference in its entirety.

BACKGROUND

Technical Field

The present disclosure relates to a power conversion technology, especially a power supply system, a power converter and a power conversion method.

Description of Related Art

With the rapid advancement of technology, various electronic devices have become an indispensable part of life. Since different types of electronic devices require different operating voltages, the electronic devices need to receive power through different power converters. Power converters usually have specially designed connection ports to prevent users from misusing the power converter with different types of electronic devices, which may cause damage. However, specially designed connection ports will create a usage restriction. Once the electronic device is replaced, the corresponding power converter will also become electronic waste.

SUMMARY

One aspect of the present disclosure is a power converter, comprising an input circuit, a conversion circuit, an output circuit and a processor. The input circuit is configured to receive and detect a front stage power from a front stage device. The conversion circuit is coupled to the input circuit. The output circuit is coupled to the conversion circuit, and is configured to supply power to a back stage device. The processor is coupled to the input circuit, the conversion circuit and the output circuit. The processor is configured to determine whether the front stage power is stable, and is configured to handshake with the back stage device to confirm a conversion power agreed/accepted by the back stage device. The processor is further configured to control the conversion circuit to operate at the conversion power, so as to generate an output power to the back stage device.

Another aspect of the present disclosure is a power conversion method, comprising: receiving and detecting, by an input circuit, a front stage power from a front stage device, wherein the input circuit coupled to a conversion circuit and a processor; determining whether the front stage power is stable by the processor, and handshaking with a back stage device by the processor, so as to confirm a conversion power agreed by the back stage device; and controlling the conversion circuit to operate at the conversion power, and providing an output power generated by the conversion circuit to the back stage device by an output circuit.

Accordingly, by detecting the status of the front stage power provided by the front stage device and communicating with the back stage device according to the status of the front stage power, it will be confirmed whether the front stage device is capable of supplying power to the back stage device, and power will be provided to the back stage device according to the conversion power confirmed after handshaking.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
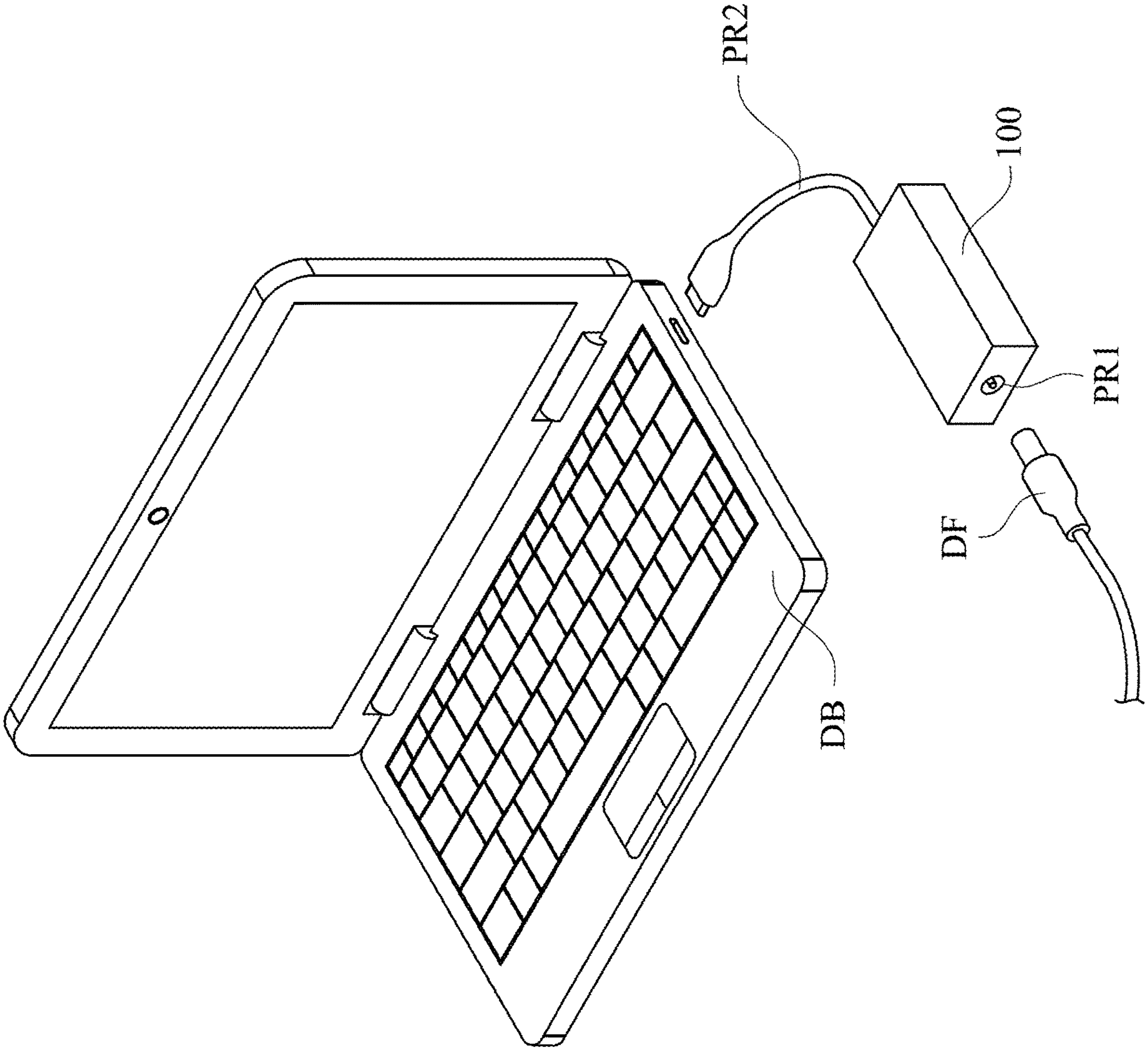
FIG. 1 is a schematic diagram of a power converter in some embodiments of the present disclosure.

FIG. 1 is a schematic diagram of a power converter 100 in some embodiments of the present disclosure. The power converter 100 includes an input port PR1 and an output port PR2. The input port PR1 is configured to connect to a front stage device DF to receive power. The output port PR2 is configured to connect to a back stage device DB (e.g., laptop computers, smartphones, home appliances, etc). The power converter 100 can convert the received front stage power into an output power by the internal conversion circuit to supply power to the back stage device DB.

In one embodiment, the front stage device DF can be a charging cable, transformer, adapter or power supply device for any electronic device, and the port specification of the front stage device DF are the same as the input port PR1. The front stage device DF can receive AC power from the mains power socket, and convert the AC power into DC power. For example, the front stage device DF can be a power adapter of a cordless vacuum cleaner. When the cordless vacuum cleaner is replaced or is no longer needed, the user can couple the power adapter (the front stage device DF) of the cordless vacuum cleaner to the power converter 100. Accordingly, the power converter 100 can receive mains power by the power adapter (the front stage device DF) of the wireless vacuum cleaner to charge a back stage device DB, so that the power adapter (the front stage device DF) of the cordless vacuum cleaner can still be used, and is not limited to being used only in cordless vacuum cleaners.

In one embodiment, the input port PR1 can be a DC power socket (e.g., DC power jack) or any power transmission interface that does not have an ability to handshake. The output port PR2 can be a connector that has an ability to handshake, such as a Universal Serial Bus Type-C port. In addition, the input port PR1 and the output port PR2 have different interfaces. In some other embodiments, the power converter 100 may also have multiple input ports PR1. The input ports PR1 has different port interfaces to be used with different types of the front stage device DF.

Figure 2:
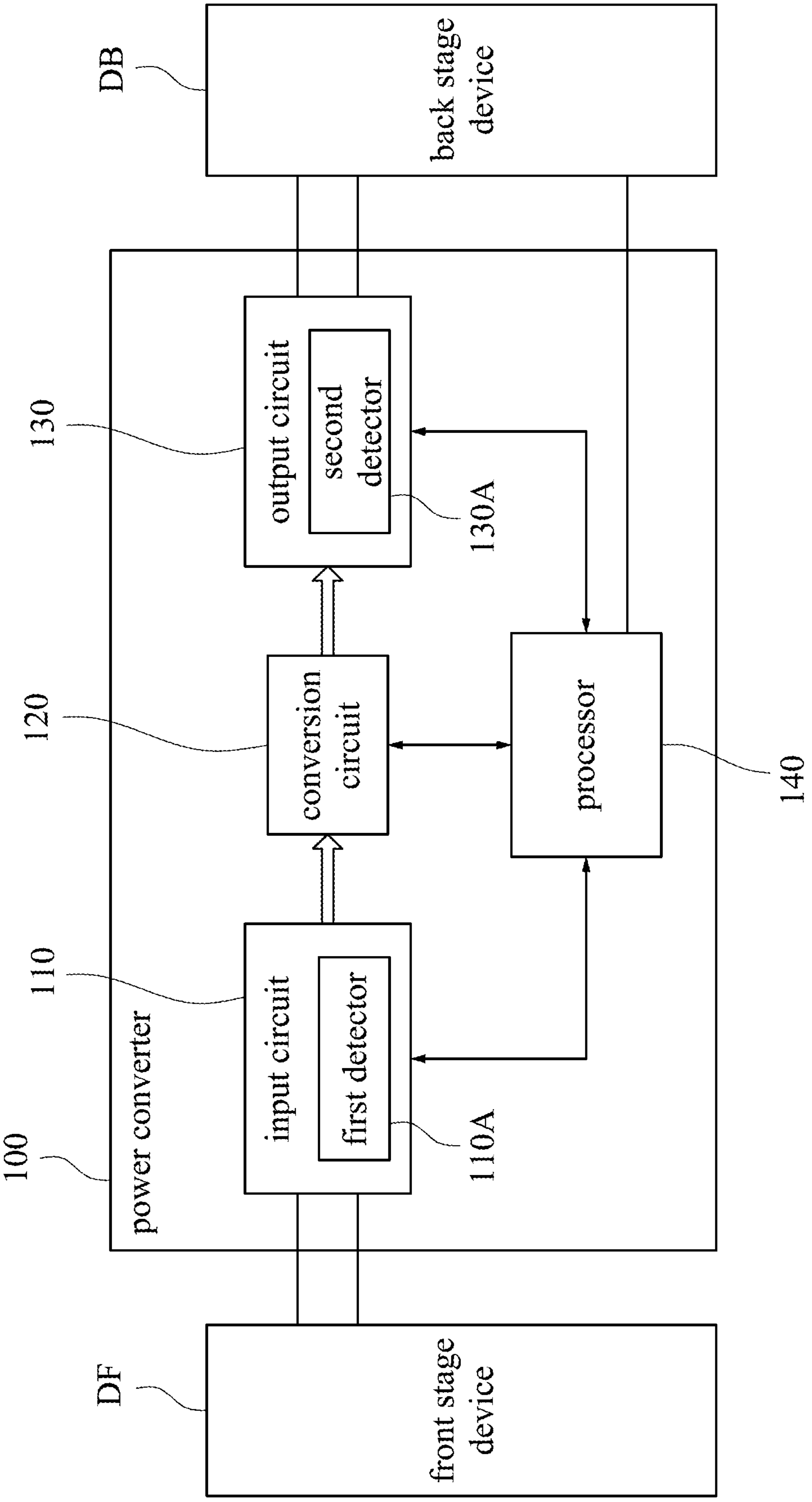
FIG. 2 is a block diagram of a power converter in some embodiments of the present disclosure.

FIG. 2 is a block diagram of a power converter 100 in some embodiments of the present disclosure. The power converter 100 includes an input circuit 110, a conversion circuit 120, a output circuit 130 and a processor 140. The input circuit 110 is configured to connect to a front stage device DF that does not have an ability to handshake, so as to receive a front stage power by the front stage device DF.

In some embodiments, the input circuit 110 further includes a first detector 110A (e.g., voltmeter, ammeter). The first detector 110A is configured to detect the status of the front stage power transmitted by the front stage device DF (e.g., the magnitude of the voltage or the voltage change, the magnitude of the current or the current change). In addition, as shown in FIG. 1 and FIG. 2, in some embodiments, the input circuit 110 further include an input port PR1, so as to receive the front stage power by the input port PR1.

The conversion circuit 120 is coupled to the input circuit 110, and is configured to receive the front stage power and convert the front stage power to different voltage levels as the output power. In one embodiment, the conversion circuit 120 is implemented by an isolated power supply, but in some other embodiments, the conversion circuit 120 may also be a non-isolated power conversion circuit. The circuit architecture of the conversion circuit 120 can be: Flyback, Forward, Half-Bridge or Full-Bridge, but the present disclosure is not limited to this.

The output circuit 130 is coupled to the conversion circuit 120, and is configured to provide the output power to the back stage device DB. In some embodiments, the output circuit 130 further includes a second detector 130A, the second detector 130A is configured to detect the status of the output power. In addition, as shown in FIG. 1 and FIG. 2, in some embodiments, the output circuit 130 further includes an output port PR2 to supply power to the back stage device DB through the output port PR2. The output port PR2 can be a USB Type-C port, and the interface of the output port PR2 is different from the interface of the input port PR1.

The processor 140 is coupled to the input circuit 110, the conversion circuit 120 and the output circuit 130, the processor 140 receives a detect signal transmitted by the first detector 110A and the second detector 130A, so as to determine the status of the front stage power and the output power (e.g., whether it is stable). The processor 140 is further configured to control the switching of each switching element in the conversion circuit 120 (e.g., control the turn-on time or switching frequency of the switching element), so that the conversion circuit 120 can operate at different powers and output different voltages and currents.

The processor 140 is communicatively connected to the back stage device DB to handshake with the back stage device DB. "Handshake" refers to data transmission between the processor 140 and the back stage device DB to confirm the parameters required for communication. Since one skilled in art can understand the meaning and principle of "handshake", it is not repeated here.

The processor 140 is configured to confirm a suitable and acceptable supply power to the back stage device DB according to the status of the front stage power (the supply power agreed/accepted by the back stage device DB is referred to as "conversion power"). After the processor 140 confirms the conversion power agreed/accepted by the back stage device DB, the processor 140 controls the conversion circuit 120 according to the conversion power, so that the conversion circuit 120 operates at the conversion power and generates an output power to the back stage device DB.

It is important to mention here that when the processor 140 of the power converter 100 confirms the supply power to the back stage device DB, the power converter 100 obtains a voltage and/or a current required by the back stage device DB according to a power supply protocol (e.g., USB Power Delivery), and then determines the supply power required by the back stage device DB.

As shown in FIG. 2, the processor 140 uses the first detector 110A of the input circuit 110 to detect and determine the status of the front stage power (e.g., determine whether it is stable) in real time, so as to evaluate the power supply capability of the front stage device DF. At the same time, the processor 140 communicates and confirms the power supply requirements that the back stage device DB can agreed/accept by handshaking with the back stage device DB. By "detecting the power supply capability of the front stage device DF" and "handshaking with the back stage device DB", the processor 140 confirms a conversion power agreed/accepted to by the back stage device DB from a power supply capability range of the front stage device DF. On the other hand, if the processor 140 cannot find an acceptable conversion power from the power supply capability range of the front stage device DF, the processor 140 turns off the conversion circuit 120, and/or control the output circuit 130 to stop supplying power to the back stage device DB.

In some embodiments, the processor 140 determines whether the received front stage power is stable according to a detection result of the first detector 110A. In other words, the processor 140 does not need to communicate or transmit data with the front stage device DF, but detects the received front stage power to determine the power supply capability of the front stage device DF.

In some embodiments, the processor 140 further includes/stores multiple preset power values. "Preset power value" can be generated correspondingly by control parameters of the conversion circuit 120. For example, the power value "100 W" represents that the processor 140 controls switching elements in the conversion circuit 120 with a first parameter (e.g., turn-on time, signal duty or frequency); the power value "60 W" represents that the processor 140 controls the switching elements in the conversion circuit 120 with a second parameter. In other words, the processor 140 is configured to control the conversion circuit 120 according to one of the preset power values, so that the conversion circuit 120 converts the front stage power into the output power at the corresponding preset power. When the processor 140 handshakes with the back stage device DB, the processor 140 selectively communicates with the back stage device DB with different preset power values. When the back stage device DB agrees/accepts one of the preset power values, this preset power value can be set as a conversion power which is the default.

Figure 3:
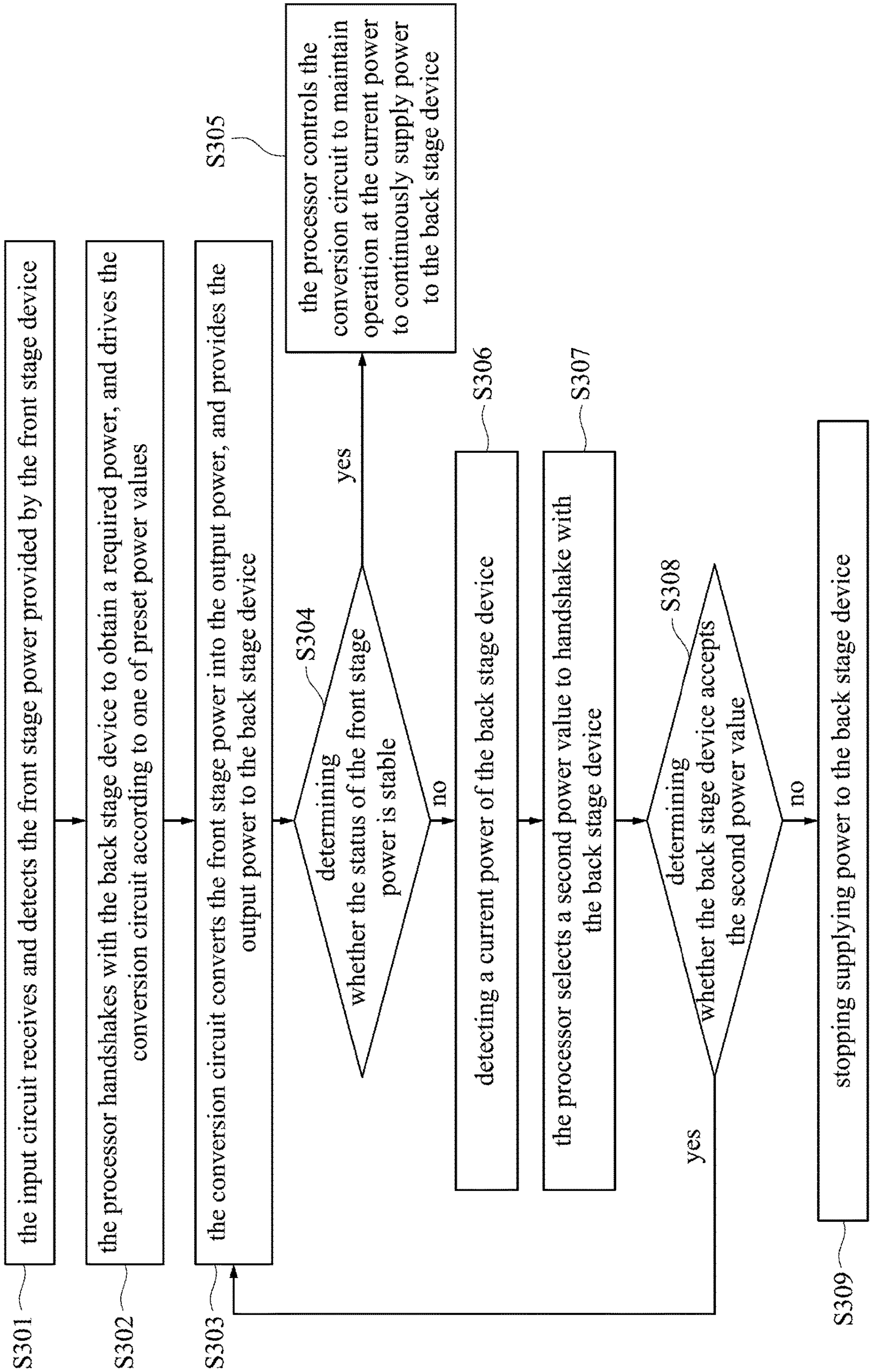
FIG. 3 is a flowchart illustrating a power conversion method in some embodiments of the present disclosure.

FIG. 3 is a flowchart illustrating a power conversion method in some embodiments of the present disclosure. As shown in FIG. 2 and FIG. 3, in step S301, the power converter 100 receives the front stage power provided by the front stage device DF through the input circuit 110. In some embodiments, the first detector 110A of the input circuit 110 detects the status of the front stage power in real time, and transmit a detect signal to the processor 140.

In step S302, the processor 140 is configured to communicate/handshake with the back stage device DB to determine the required power value of the back stage device DB. "Required power value" can be a set value provided by the back stage device DB (e.g., the maximum supply power that can be received is 80 W), or it can be a requirement value generated by the back stage device DB according to the current operating status (e.g., 55 W). In other words, the required power value is based on the current load status of the back stage device DB. The processor 140 drives the conversion circuit 120 according to a preset power value, which is close to and greater than or equal to the required power value, to convert the front stage power into the output power.

For example, if the preset power values of the processor 140 include "100 W, 60 W, 45 W, 30 W", and a required power value of the back stage device DB is 55 W, the processor 140 can drive the conversion circuit 120 directly with the required power value, or select a preset power values, which is closest to and greater than the required power value, to drive the conversion circuit 120. In this embodiment, since the preset power value "60 W" is closest to the required power value "55 W", the processor drives the conversion circuit 120 according to the preset power value "60 W" (referred to as "first power value").

In step S303, the driven conversion circuit 120 converts the front stage power into the output power, and provides the output power to the back stage device DB through the output circuit 130. When the power converter 100 supplies power, the first detector 110A detects the status of the front stage power in real time, and the second detector 130A detects the status of the output power.

In step S304, the processor 140 determines whether the status of the front stage power is stable. If the front stage power remains stable, in step S305, the processor 140 controls the conversion circuit 120 to maintain operation at the current power (i.e., the first power value) to continuously supply power to the back stage device DB. In some embodiments, the processor 140 determines whether the change of voltage or current of the front stage power within a period of time remains within a preset range. If the change of voltage or current exceeds the preset range, it means that the front stage power is unstable. In some other embodiments, the processor determines whether the front stage power is greater than an upper threshold or less than a lower threshold to estimate whether the front stage power is stable.

In some embodiments, when the front stage power remains stable, the processor 140 stores/sets the current power (e.g., the first power value) of the conversion circuit 120 as a default operating power (referred to as "priority power value"), this priority power value will be set to correspond to the front stage device DF. In other words, as long as an electrical connection relationship between the power converter 100 and the front stage device DF is not released, the processor 140 will subsequently drive the conversion circuit 120 with the priority power value (the first power value). In addition, when the electrical connection relationship between the power converter 100 (the input circuit 110) and the front stage device DF is released, the processor 140 will cancel/delete the set priority power value (i.e., reset data).

If the front stage power does not remain stable, it means that the power supply capacity of the front stage device DF cannot provide the power corresponding the current power (i.e., the first power value, such as "60 W"). In step S306, the processor 140 detects a current power of the back stage device DB in real time by the second detector 130A in the output circuit 130 (e.g., detect the voltage and current actually required by the back stage device DB).

Next, in step S307, the processor 140 selects a preset power value that "less than the first power value and the current power of the back stage device DB" from multiple preset power values as a second power value to communicate and handshake with the back stage device DB. For example, in the above step S303, the required power value of the back stage device DB is "55 W", the conversion circuit 120 is controlled at the first power value "60 W", but the front stage power provided by the front stage device DF is not stable. At this time, the second detector 130A detects that a current operating power of the back stage device DB is "40 W". Therefore, the processor 140 selects a preset power value "30 W" (the second power value), which is the next level and lower than the current power of the back stage device DB, from multiple preset power values "100 W, 60 W, 45 W, 30 W" to handshake with the back stage device DB.

It is important to mention here that the processor 140 detects the current power of the back stage device DB in real time by the second detector 130A in the above step S306. However, in some other embodiments, the processor 140 may not obtain the current power of the back stage device DB, but directly use "a preset power value which is the next level and lower than the first power value" as the second power value. In other words, step S306 is not necessary.

In step S308, the processor 140 determines whether the back stage device DB agrees/accepts the second power value. If the back stage device DB agrees/accepts the second power value "30 W" as an acceptable conversion power, then the processor 140 controls the conversion circuit 120 to maintain operation at the current power (i.e., the second power value) to continuously supply power to the back stage device DB. At the same time, the processor 140 also continues to detect whether the front stage power remains stable, that is, performs steps S303 and S304. In other words, the processor 140 drives the conversion circuit 120 with different preset power values sequentially until the front stage power remains stable.

As mentioned above, similar to the above step S305, when the conversion circuit 120 is operating at the current power (i.e., the second power value), if the front stage power remains stable, the processor 140 sets the current power (i.e., the second power value) as a priority power value, and this priority power value will be set to correspond to the front stage device DF. As long as the electrical connection relationship between the power converter 100 and the front stage device DF is not released, the processor 140 will subsequently drive the conversion circuit 120 with the priority power value (the second power value).

On the other hand, if the back stage device DB does not agree/accept the second power value "30 W" as the conversion power (e.g., the power is too low), it means that the power supply capacity of the front stage device DF cannot support the power supply of the back stage device DB. At this time, in step S309, the processor 140 controls to turn off the conversion circuit 120, or controls the output circuit 130 to stop supplying power to the back stage device DB, but the processor 140 still maintains communication with the back stage device DB. In addition, the processor 140 may set the current power (i.e., the second power value) as a priority power value corresponding to the front stage device DF. Accordingly, when one terminal of the power converter 100 is still connected to the front stage device DF, but another terminal is connected to another the back stage device, the processor 140 can handshake with the back stage device according to the priority power value (e.g., perform the above step S302).

Figure 4:
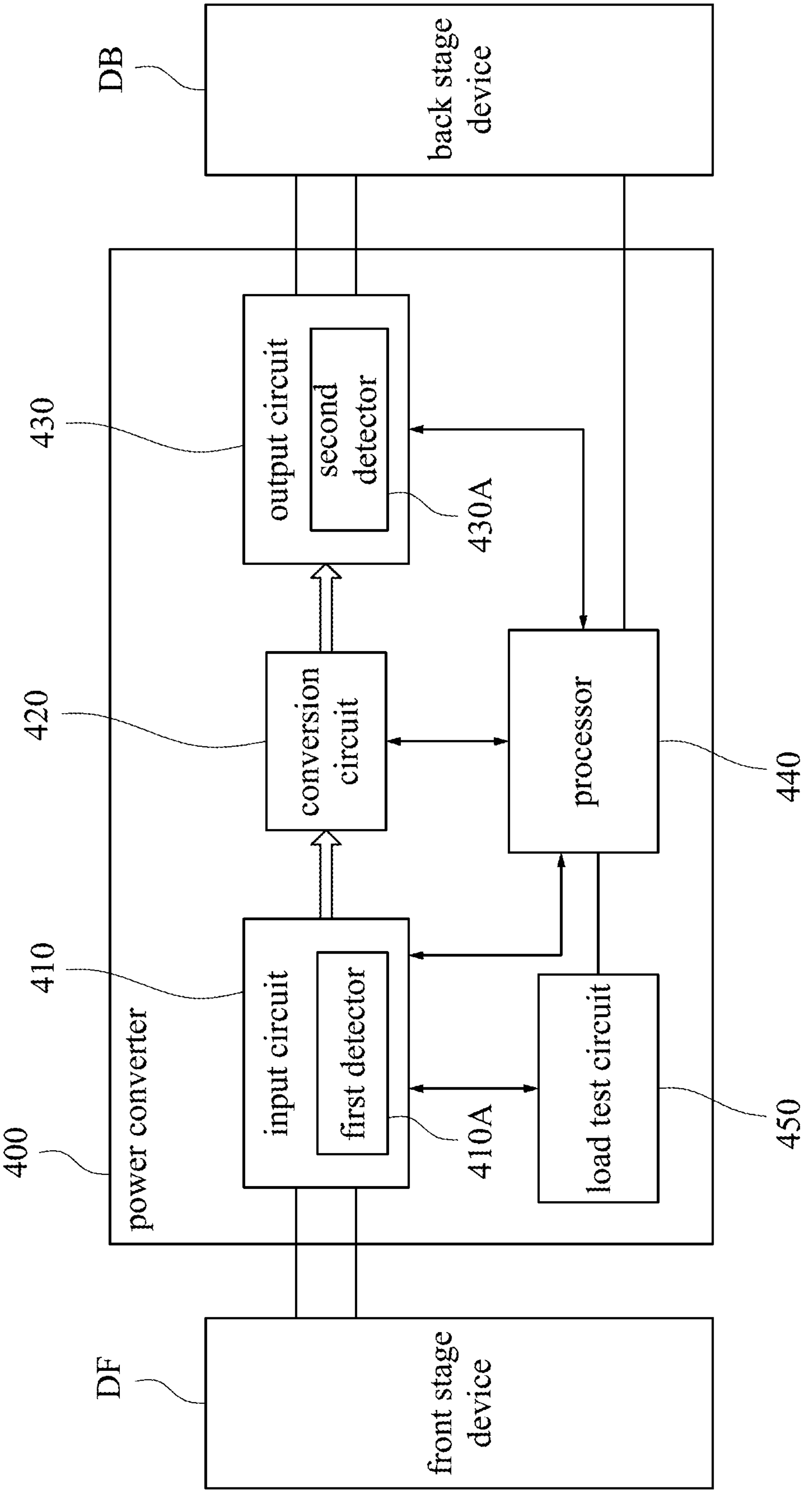
FIG. 4 is a block diagram of a power converter in some other embodiments of the present disclosure.

FIG. 4 is a block diagram of a power converter 400 in some other embodiments of the present disclosure. In FIG. 4, the similar components associated with the embodiment of FIG. 1 are labeled with the same numerals for ease of understanding. The specific principle of the similar component has been explained in detail in the previous paragraphs, and unless it has a cooperative relationship with the components of FIG. 4, it is not repeated here.

The power converter 400 includes an input circuit 410, a conversion circuit 420, an output circuit 430, a processor 440 and a load test circuit 450. The input circuit 410 is configured to receive the front stage power from the front stage device DF, and detect the status of the front stage power by the first detector 410A. The conversion circuit 420 is coupled between the input circuit 410 and the output circuit 430, and is configured to convert the front stage power into the output power, so as to provide the output power to the back stage device DB through the output circuit 430. As the same as the previous embodiment, when the power converter 400 supplies power to the back stage device DB, the output circuit 430 can detect the status of the output power in real time by the second detector 430A to determine the current power of the back stage device DB.

The processor 440 is coupled to the input circuit 410, the conversion circuit 420, the output circuit 430 and the load test circuit 450, and is configured to control the conversion circuit 420 to operate at one of multiple preset power values. The load test circuit 450 is coupled to the input circuit 410 to receive the front stage power. In this embodiment, the processor 440 is configured to adjust the overall impedance of the load test circuit 450 to test the power supply capability of the front stage device DF through the load test circuit 450.

Figure 5:
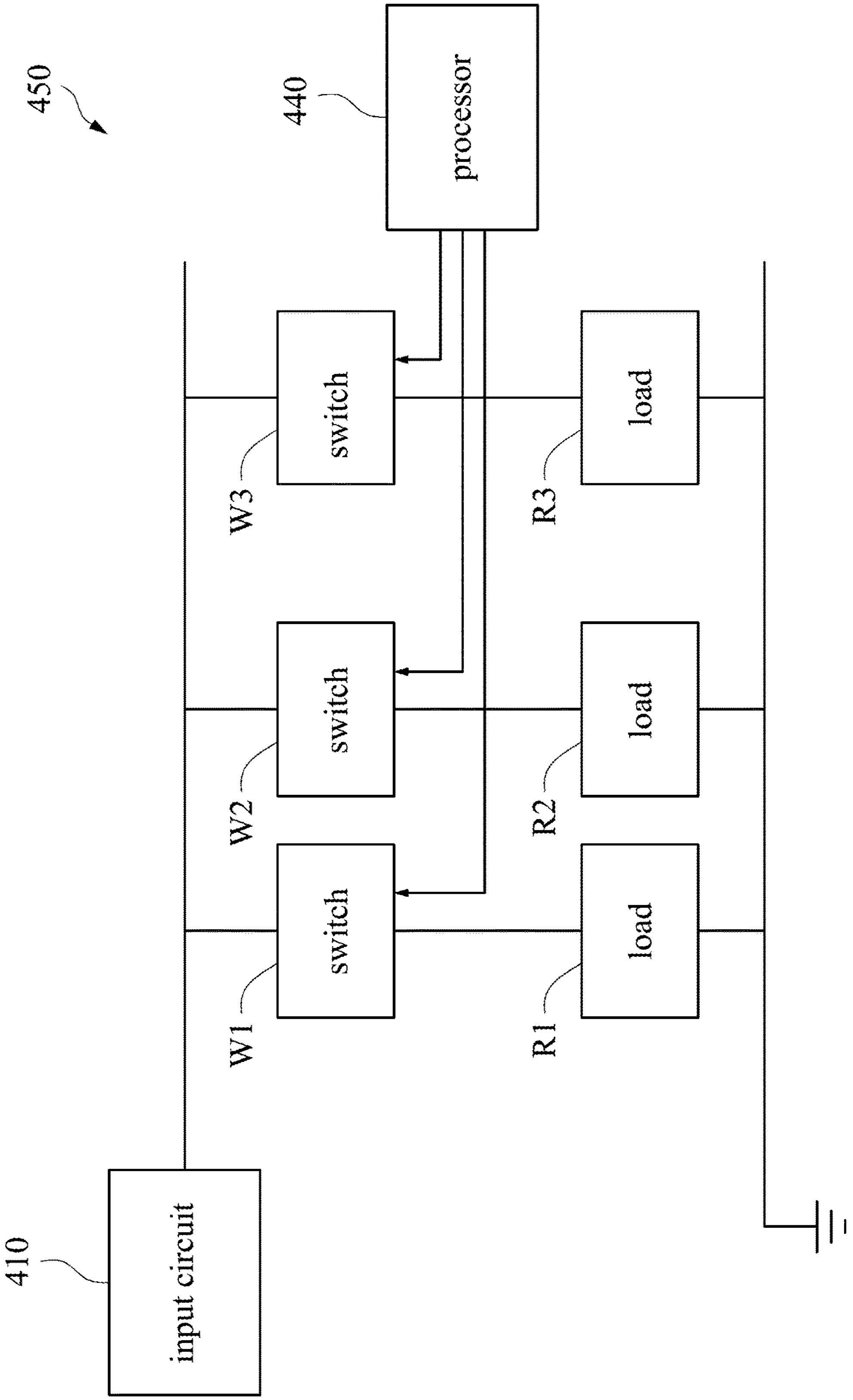
FIG. 5 is a block diagram of a load test circuit in some other embodiments of the present disclosure.

FIG. 5 is a block diagram of a load test circuit 450 in some other embodiments of the present disclosure. The load test circuit 450 includes multiple loads R1-R3 (dummy load, such as resistors) with different impedance values. The impedance values of the loads R1-R3 correspond to different preset power values (e.g., an impedance value of the first load R1 corresponds to the first power value, an impedance value of the second load R2 corresponds to the second power value), so the processor 440 can use the loads R1-R3 to test the power supply capability of the front stage device DF. Specifically, the load test circuit 450 includes multiple loads (e.g., R1-R3 shown in FIG. 5) and the corresponding switches W1-W3. The processor 440 changes the overall impedance of the load test circuit 450 by controlling turn-on or turn-off each of the switches W1-W3.

For example, the preset power values stored in the processor 440 include "100 W, 60 W, 30 W", and among multiple loads R1-R3 of the load test circuit 450, the load R1 is the largest and the load R3 is the smallest. Therefore, the loads R1-R3 can be configured to simulate the power converter 400 operating the conversion circuit 420 at different preset power values. For example, when the switch W1 is turned on, but the switch W2-W3 is turned off, the load test circuit 450 is configured to simulate the impedance of the power converter 400 operating at the preset power values 100 W, so as to receive power from the front stage device DF. Similarly, when the switch W3 is turned on, but the switches W1-W2 are turned off, the load test circuit 450 simulates the impedance of the power converter 400 when it operates at the preset power values 30 W. In other words, the processor 440 selectively controls conduction between one of loads R1-R3 and the input circuit 410 to receive the front stage power. At the same time, the processor 440 determines whether the front stage power remains stable by the first detector 410A to confirm the power supply capability of the front stage device DF. In some other embodiments, the processor 440 can turn on one or more switches W1-W3 at the same time, so that the impedance of the load test circuit 450 has more combinations of changes.

As mentioned above, the load test circuit 450 is configured to simulate the impedance of the power converter 400 when operating with different preset power values. Therefore, when anyone of loads R1-R3 of the load test circuit 450 are connect to the input circuit 410, the processor 440 will stop driving the conversion circuit 420 (or the conversion circuit 420 will stop receiving the front stage power). At this time, the output circuit 430 will not supply power to the back stage device DB.

Figure 6:
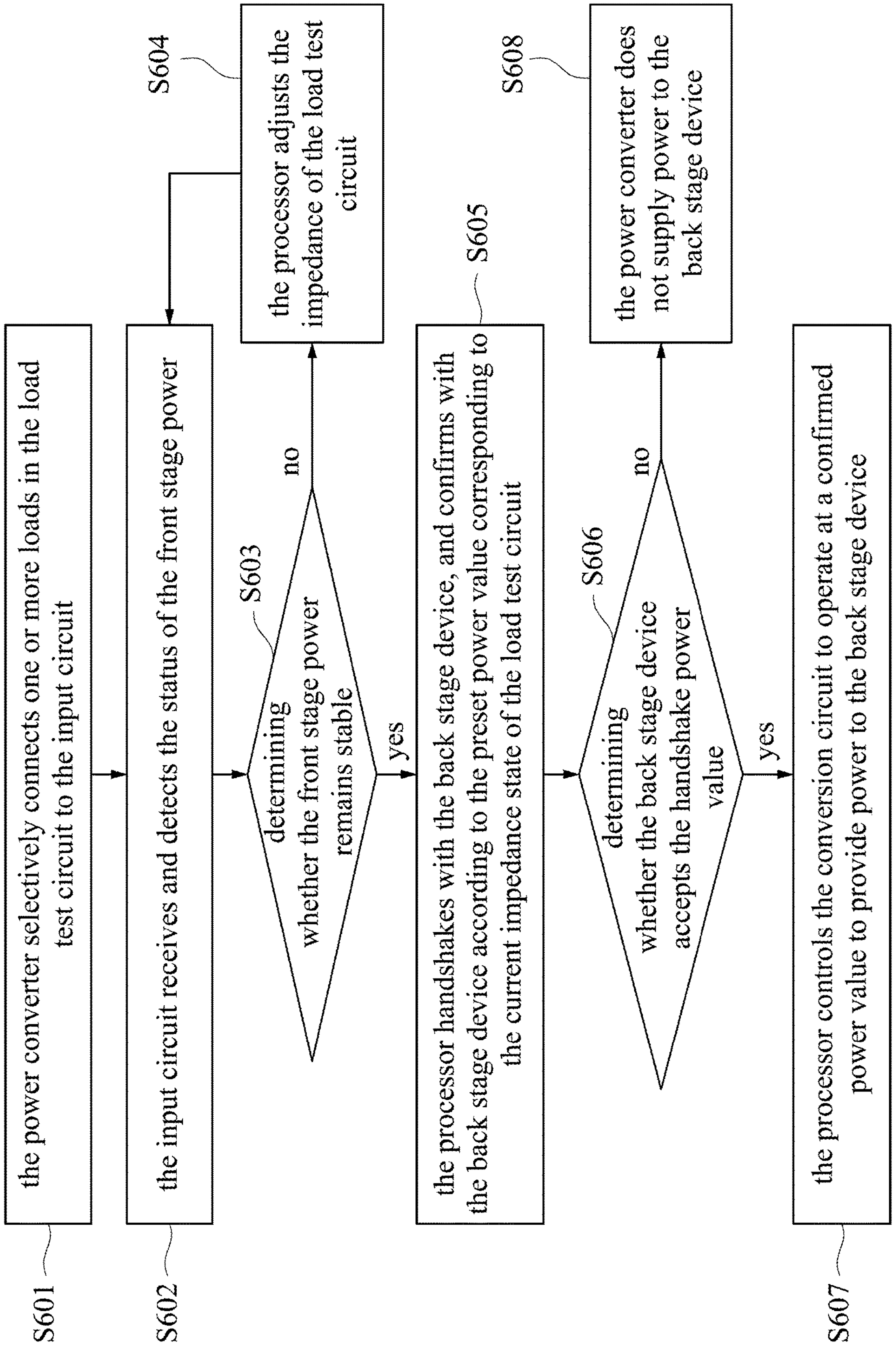
FIG. 6 is a flowchart illustrating a power conversion method in some other embodiments of the present disclosure.

FIG. 6 is a flowchart illustrating a power conversion method in some other embodiments of the present disclosure. Referring to FIGS. 4-6, in step S601, when the power converter 400 is connected to the front stage device DF (through the input port PR1 as shown in FIG. 1), the processor 440 will stop driving the conversion circuit 420 (or remain turn-off), and selectively connect one or more of the loads R1-R3 in the load test circuit 450 to the input circuit 410. In one embodiment, the processor 440 first connects the load R1 to the input circuit 410, but the present disclosure is not limited to this.

In step S602, the input circuit 410 receives the front stage power from the front stage device DF, and detects the status of the front stage power by the first detector 410A, and the first detector 410A transmits the detect signal to the processor 440.

In step S603, the processor 440 determines whether the front stage power remains stable. If the front stage power does not remain stable, it means that the power supply capacity of the front stage device DF is insufficient. In one embodiment, the processor 440 stores three preset power values "100 W, 60 W, 30 W", corresponding to the loads R1-R3 respectively. Therefore, when the load R1 is connect to the input circuit 410 (i.e., the switch W1 is turned on, the switch W2-W3 are turned off), if the front stage power is unstable, it means that the front stage device DF cannot provide the power supply corresponding to the preset power value "100 W" (the first power value).

As mentioned above, when the front stage power does not remain stable, performing step S604. In step S604, the processor 440 adjusts the impedance of the load test circuit 450. For example, instead connect the load R2 (e.g., corresponds to the second power value "60 W" in the preset power values) to the input circuit 410. After the impedance of the load test circuit 450 is adjusted, the input circuit 410 receives the front stage power from the front stage device DF again, and detects the status of the front stage power by the first detector 410A, that is, performing the above step S602.

On the other hand, after the processor 440 sequentially adjusts the connected loads in the load test circuit 450 according to the status of the front stage power, so that the front stage power remains stable, the processor 440 turns off the load test circuit 450, and performs step S605. At this time, the power converter 400 is connected to the back stage device DB (through the output port PR2 as shown in FIG. 1), and the processor 440 handshakes with the back stage device DB. The processor 440 confirms with the back stage device DB according to the preset power value (e.g., the second power value "60 W") corresponding to the current impedance state of the load test circuit 450 (e.g., the load R2).

In step S606, the processor 440 determines whether the back stage device DB agrees/accepts the handshake power value (e.g., the second power value "60 W"). If the back stage device DB agrees/accepts the handshake power value "60 W" as the conversion power for power supply, in step S607, the processor 440 controls/drives the conversion circuit 420 to operate at a confirmed power value (i.e., the second power value) to provide power to the back stage device DB. In one embodiment, the processor 440 can continue to detect whether the front stage power remains stable, that is, performs step S603.

In some embodiments, the processor 440 stores/sets the confirmed power value (i.e., the second power value) as a default operating power (i.e., the priority power value), which is set to correspond to the front stage device DF. As long as the electrical connection relationship between the power converter 400 (the input circuit 410) and the front stage device DF is not released, the processor 440 will subsequently drive the conversion circuit 420 with the priority power value (the second power value).

On the other hand, if the back stage device DB does not agree/accept the second power value "60 W" as the conversion power (e.g., the power is too low), it means that the power supply capacity of the front stage device DF cannot support the power supply of the back stage device DB. At this time, in step S608, the processor 440 will turn off the conversion circuit 420 to ensure that the power converter 400 does not supply power to the back stage device DB.

In one embodiment, regardless of whether the power converter 400 is connected to the back stage device DB, as long as it is confirmed in step S603 that the front stage power remains stable, the processor 440 records a priority power value corresponding to the front stage device DF according to one or more loads connected to the input circuit 410 in loads R1-R3. In other words, when the first load R1 (or the second load R2, the third load R3) is connect to the input circuit 410, and the front stage power remains stable, the processor 440 sets the corresponding first power value (or the second load R2, the third load R3) as a priority power value corresponding to the front stage device DF. The processor 440 does not cancel/delete the stored priority power value until the electrical connection relationship between the power converter 400 and the front stage device DF is released.

The power converter 100/400 of the present disclosure uses the preset power values to handshake with the back stage device DB, after the back stage device DB receives one of preset power values, the preset power value will be set as a conversion power to drive the conversion circuit 120/420 to generate the output power to the back stage device DB. Since the power converter 100/400 does not communicate data with the front stage device DF, but detects the power supply capability, the power conversion method and the power converter 100/400 of the present disclosure can be easily applied to various front stage device DF and the back stage device DB, and can avoid the problem of damage caused by insufficient power supply capacity of the front stage device DF.

Figure 7:
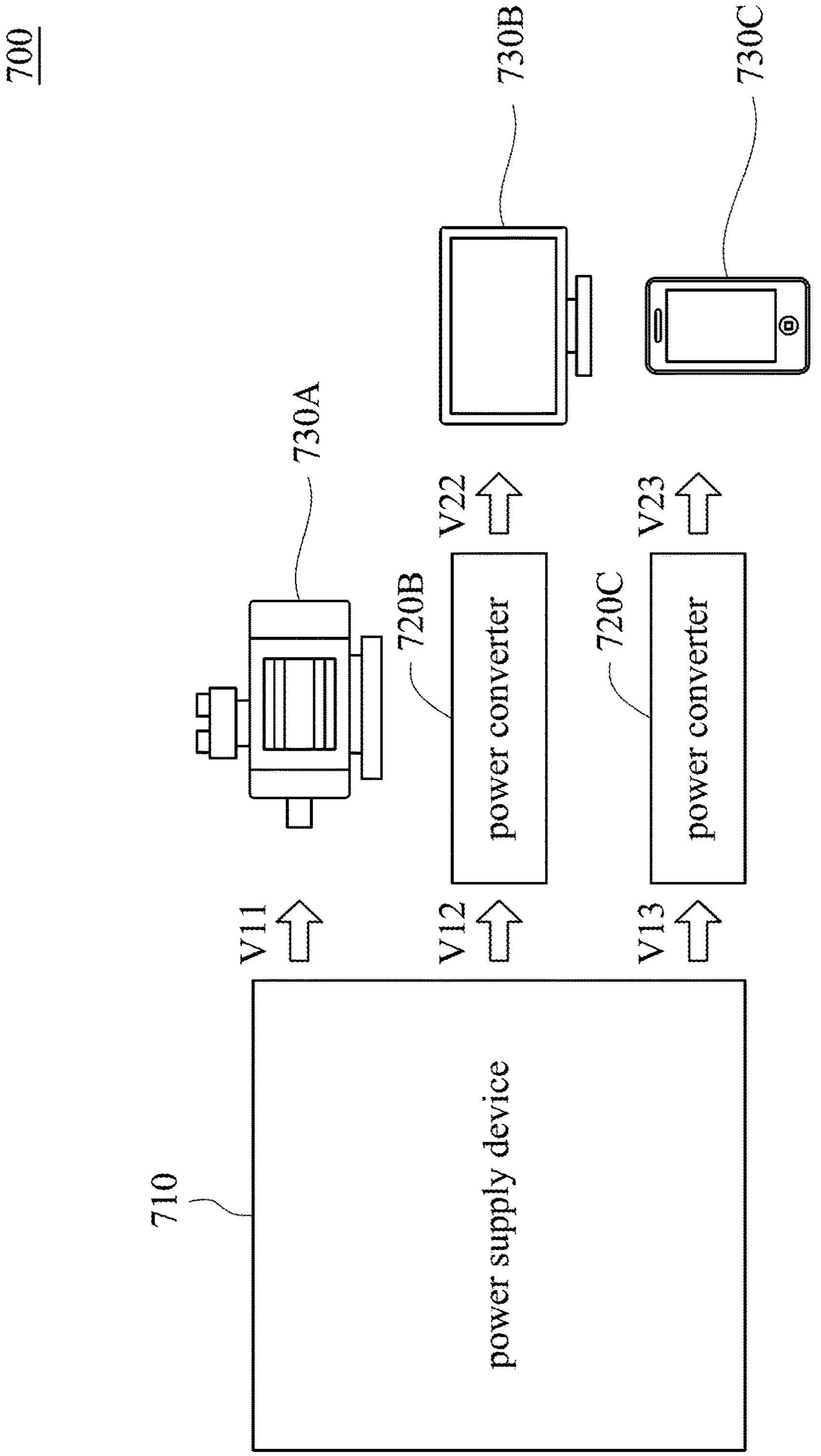
FIG. 7 is a schematic diagram of a power supply system in some embodiments of the present disclosure.

FIG. 7 is a schematic diagram of a power supply system 700 in some embodiments of the present disclosure. The power supply system 700 include a power supply device 710, one or more power converters 720B-720C and multiple electronic devices 730A-730C. The power supply device 710 can be a transformer with multiple output ports. The power converter 720B-720C can be implemented by the power converter 100 shown in FIG. 2 or the power converter 400 shown in FIG. 4.

The power converter 720B-720C is coupled between the power supply device 710 and electronic devices 730B-730C, so as to receive the front stage power V11-V13 provided by the power supply device 710. The power converter 720B-720C is configured to confirm a conversion power agreed/accepted by the back stage device (i.e., the electronic devices 730B-730C), and to control the internal conversion circuit operate at the conversion power to generate the output power to the back stage device. The power converters 720B-720C can be implemented by the circuit shown in FIGS. 1-5, thus a description in this regard is not further provided herein.

The electronic devices 730A-730C can be different types of electronic devices, such as motor, TV, mobile phone charger, etc. In one embodiment, if the electronic device 730A is a kind of device that does not have an ability to handshake (e.g., motor), that is, the electronic device 730A cannot handshake with the front stage (the power supply device 710). The power supply device 710 will directly provide power V11 to the electronic device 730A. At the same time, the power supply device 710 further provides the front stage power V12-V13 to the power converters 720B-720C respectively. The power converters 720B-720C handshake with the electronic device 730B-730C in the back stage, and are configured to convert the front stage power V12-V13 into output power V22-V23 to supply power to the electronic device 730B-730C.

As shown in FIG. 7, since the actual power supply required by each electronic devices 730A-730C will change according to usage, the power converter 720B-720C adjusts the operating power in real time and dynamically according to the power conversion method in FIG. 3 or FIG. 6 to change the output power V22-V23. For example, if the electronic device 730A, which does not have an ability to handshake, is overloaded and requires more power, and the front stage power V12, V13 is unstable, the power converter 720B and/or the power converter 720C obtain the current power of the corresponding back stage device (i.e., the electronic device 730B, 730C), and selects one of the preset power values less than the current power to handshake with the back stage device. The power converter 720B and/or the power converter 720C perform corresponding load reduction according to the above embodiment, so that each of the electronic devices 730A-730C can still obtain sufficient power for operation. Accordingly, power can be utilized more effectively and the balance of the power supply system 700 can be ensured.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A power converter, comprising:

an input circuit configured to receive and detect a front stage power from a front stage device;

a conversion circuit coupled to the input circuit;

an output circuit coupled to the conversion circuit, and configured to supply power to a back stage device; and a processor coupled to the input circuit, the conversion circuit and the output circuit, wherein the processor is configured to determine whether a voltage or a current of the front stage power remains within a preset range over a period of time to determine whether the front stage power is stable, and is configured to handshake with the back stage device to confirm a conversion power agreed by the back stage device;

wherein the processor is further configured to control the conversion circuit to operate at the conversion power, so as to generate an output power to the back stage device.

2. The power converter of claim 1, wherein the processor has a plurality of preset power values, the processor is configured to handshake with the back stage device according to the plurality of preset power values, when the back stage device agrees with one of the plurality of preset power values, the processor is configured to set the one of the plurality of preset power values as the conversion power.

3. The power converter of claim 2, wherein when the front stage power remains stable, the processor is configured to store the one of the plurality of preset power values as a priority power value corresponding to the front stage device; and wherein when an electrical connection relationship between the power converter and the front stage device is released, the processor is configured to cancel the priority power value.

4. The power converter of claim 2, wherein the processor is configured to handshake with the back stage device, so as to obtain a required power value of the back stage device; and wherein the processor is further configured to drive the conversion circuit according to a first power value of the plurality of preset power values, and the first power value is greater than or equal to the required power value.

5. The power converter of claim 4, wherein when the processor drives the conversion circuit according to the first power value and the front stage power does not remain stable, the processor is configured to select a second power value of the plurality of preset power values to handshake with the back stage device, and when the back stage device agrees with the second power value, the processor is configured to set the second power value as the conversion power to drive the conversion circuit.

6. The power converter of claim 5, wherein when the processor drives the conversion circuit according to the first power value and the front stage power does not remain stable, the processor is further configured to obtain a current power of the back stage device, and the second power value selected by the processor is less than the first power value and the current power.

7. The power converter of claim 5, wherein when the processor is configured to handshake with the back stage device according to the second power value, and the back stage device does not agree with the second power value, the power converter is configured to stop supplying power to the back stage device.

8. The power converter of claim 2, wherein the processor at least has a first power value and a second power value, and the first power value is greater than the second power value, and the power converter further comprises:

a load test circuit coupled to the processor, and at least comprising a first load and a second load, wherein an impedance value of the first load corresponds to the first power value, an impedance value of the second load corresponds to the second power value, and the processor is configured to control the load test circuit to connect the first load or the second load to the input circuit to receive the front stage power; and wherein the processor is further configured to determine whether the front stage power remains stable.

9. The power converter of claim 8, wherein when the processor controls the load test circuit to connect the first load or the second load to the input circuit, the processor stops driving the conversion circuit.

10. The power converter of claim 8, wherein when the processor controls the load test circuit to connect the first load to the input circuit and the front stage power remains stable, the processor is configured to handshake with the back stage device according to the first power value, and when the back stage device agrees with the first power value, the processor sets the first power value as the conversion power to drive the conversion circuit.

11. The power converter of claim 10, wherein when the first load is connected to the input circuit and the front stage power does not remain stable, the processor is configured to control the load test circuit to connect the second load to the input circuit; and wherein when the second load is connected to the input circuit and the front stage power remains stable, the processor is configured to handshake with the back stage device according to the second power value, and when the back stage device does not agree with the second power value, the processor turns off the conversion circuit.

12. The power converter of claim 11, wherein when the first load or the second load is connected to the input circuit and the front stage power remains stable, the processor is configured to set the first power value or the second power value as a priority power value corresponding to the front stage device; and wherein when an electrical connection relationship between the power converter and the front stage device is released, the processor is configured to cancel the priority power value.

13. A power conversion method, comprising:

receiving and detecting, by an input circuit, a front stage power from a front stage device, wherein the input circuit is coupled to a conversion circuit and a processor;

determining whether a voltage or a current of the front stage power remains within a preset range over a period of time to determine whether the front stage power is stable by the processor, and handshaking with a back stage device by the processor, so as to confirm a conversion power agreed by the back stage device; and controlling the conversion circuit to operate at the conversion power, and providing an output power generated by the conversion circuit to the back stage device by an output circuit.

14. The power conversion method of claim 13, wherein determining whether the voltage or the current of the front stage power remains within the preset range over the period of time to determine whether the front stage power is stable, and handshaking with the back stage device to confirm the conversion power agreed by the back stage device comprises:

handshaking with the back stage device according to a plurality of preset power values of the processor; and when the back stage device agrees with one of the plurality of preset power values, setting the one of the plurality of preset power values as the conversion power.

15. The power conversion method of claim 14, further comprising:

when the front stage power remains stable, storing the one of the plurality of preset power values as a priority power value corresponding to the front stage device; and when an electrical connection relationship between the input circuit and the front stage device is released, canceling the priority power value.

16. The power conversion method of claim 14, wherein handshaking to the back stage device according to the plurality of preset power values of the processor comprises:

handshaking with the back stage device by the processor, so as to obtain a required power value of the back stage device; and driving the conversion circuit according to a first power value of the plurality of preset power values, wherein the first power value is greater than or equal to the required power value.

17. The power conversion method of claim 16, wherein setting the one of the plurality of preset power values as the conversion power comprises:

when the processor drives the conversion circuit according to the first power value and the front stage power does not remain stable, selecting a second power value of the plurality of preset power values to handshake with the back stage device; and when the back stage device agrees with the second power value, setting the second power value as the conversion power to drive the conversion circuit.

18. The power conversion method of claim 17, wherein setting the one of the plurality of preset power values as the conversion power further comprises:

when the processor drives the conversion circuit according to the first power value and the front stage power does not remain stable, obtaining a current power of the back stage device, wherein the second power value is less than the first power value and the current power.

19. The power conversion method of claim 17, wherein setting the one of the plurality of preset power values as the conversion power further comprises:

when the back stage device does not agree with the second power value, turning off the conversion circuit, and/or controlling the output circuit to stop supplying power to the back stage device.

20. The power conversion method of claim 13, wherein determining whether the voltage or the current of the front stage power remains within the preset range over the period of time to determine whether the front stage power is stable, and handshaking with the back stage device to confirm the conversion power agreed by the back stage device comprises:

selectively connecting a first load or a second load of a load test circuit to the input circuit to determine whether the front stage power remains stable, wherein an impedance value of the first load corresponds to a first power value, an impedance value of the second load corresponds to a second power value, and the first power value is greater than the second power value.

21. The power conversion method of claim 20, wherein selectively connecting the first load or the second load of the load test circuit to the input circuit to determine whether the front stage power remains stable comprises:

when the first load is connected to the input circuit and the front stage power remains stable, handshaking with the back stage device according to the first power value; and when the back stage device agrees with the first power value, setting the first power value as the conversion power to drive the conversion circuit.

22. The power conversion method of claim 21, wherein selectively connecting the first load or the second load of the load test circuit to the input circuit to determine whether the front stage power remains stable comprises:

when the first load is connected to the input circuit and the front stage power does not remain stable, controlling the load test circuit to connect the second load to the input circuit;

when the second load is connected to the input circuit and the front stage power remains stable, handshaking with the back stage device according to the second power value; and when the back stage device does not agree with the second power value, turning off the conversion circuit.

23. The power conversion method of claim 22, further comprising:

when the first load or the second load is connected to the input circuit and the front stage power remains stable, setting the first power value or the second power value as a priority power value corresponding to the front stage device; and when an electrical connection relationship between the input circuit and the front stage device is released, canceling the priority power value.

* * * * *